United States Patent
Coan et al.

(10) Patent No.: US 7,294,174 B2
(45) Date of Patent: Nov. 13, 2007

(54) AIR DEHYDRATION MEMBRANE

(75) Inventors: Frederick L. Coan, Antioch, CA (US); John A. Jensvold, Benicia, CA (US)

(73) Assignee: Generon IGS, Inc., Houston, TX (US)

( * ) Notice: Subject to any disclaimer, the term of this patent is extended or adjusted under 35 U.S.C. 154(b) by 251 days.

(21) Appl. No.: 11/185,049

(22) Filed: Jul. 20, 2005

(65) Prior Publication Data

US 2005/0252377 A1 Nov. 17, 2005

Related U.S. Application Data

(63) Continuation-in-part of application No. 10/640,363, filed on Aug. 13, 2003, now abandoned.

(51) Int. Cl.
  *B01D 53/22* (2006.01)
  *B01D 59/12* (2006.01)
  *B01D 29/00* (2006.01)
  *B01D 39/14* (2006.01)

(52) U.S. Cl. .......................... 96/4; 96/8; 55/16; 55/68; 55/158; 210/490; 210/500.23

(58) Field of Classification Search ................ 210/649, 210/490, 500.23; 55/16, 68, 158; 96/4, 96/8

See application file for complete search history.

(56) References Cited

U.S. PATENT DOCUMENTS

| 4,718,921 A | | 1/1988 | Makino |
| 4,772,392 A | | 9/1988 | Sanders |
| 4,783,201 A | | 11/1988 | Rice |
| 4,900,626 A | * | 2/1990 | Fabre ............................ 96/10 |
| 4,911,844 A | | 3/1990 | Linder |
| 4,955,993 A | * | 9/1990 | Sanders et al. ................ 95/54 |
| 5,002,590 A | | 3/1991 | Friesen |
| 5,004,861 A | | 4/1991 | Pasternak |
| 5,108,464 A | | 4/1992 | Friesen |
| 5,163,977 A | | 11/1992 | Jensvold |
| 5,698,105 A | | 12/1997 | Colquhoun |
| 6,083,297 A | | 7/2000 | Valus |
| 6,616,735 B1 | | 9/2003 | Burban |
| 6,635,104 B2 | * | 10/2003 | Komkova et al. ............... 96/4 |
| 6,688,477 B2 | * | 2/2004 | Kalthod ....................... 210/490 |
| 6,805,730 B2 | * | 10/2004 | Herczeg ........................... 96/8 |
| 2003/0140790 A1 | | 7/2003 | Herczeg |

FOREIGN PATENT DOCUMENTS

| EP | 0179474 A2 | 4/1986 |
| KR | 2002013036 | 2/2002 |
| WO | WO 98/29478 | 7/1998 |

* cited by examiner

*Primary Examiner*—Walter D. Griffin
*Assistant Examiner*—Amber Miller-Harris
(74) *Attorney, Agent, or Firm*—William H. Eilberg

(57) ABSTRACT

An air dehydration membrane is made of a hydrophilic polymer having a permeability for water vapor which is greater than its permeability for air, and having low selectivity between oxygen and nitrogen. The membrane has a hydrophilic coating, which itself may be a polymer. The coating does not affect the selectivity of the coated membrane with respect to oxygen and nitrogen, but does increase selectivity of the membrane with respect to water vapor. A preferred material for the membrane is polysulfone. Preferred materials for the coating are poly vinyl alcohol and Triton X-100. The membrane is selected such that the dominant mechanism for gas flow through the membrane is Knudsen flow. The membranes are made at low cost, and can outperform existing commercial membranes in either volumetric productivity or product recovery.

20 Claims, No Drawings

AIR DEHYDRATION MEMBRANE

CROSS-REFERENCE TO PRIOR APPLICATION

This is a Continuation-in-Part of U.S. patent application Ser. No. 10/640,363, filed Aug. 13, 2003 now abandoned.

BACKGROUND OF THE INVENTION

This invention relates to the field of polymeric membranes, and provides a membrane useful for removing water or water vapor from air or other gas streams.

Compressed air is commonly used to drive pneumatically operated equipment, such as air-driven motors for hand tools, pneumatically operated valves, and the like. One problem arising from the use of compressed air is that, because there is usually water vapor in the air before the compression step, the process of compression produces liquid water. The result is that liquid water becomes entrained with the compressed air. If the water is not removed, it is likely to cause rusting of components, and it may impair the performance of the motor, valve or other component being operated. Moreover, in the case of a pneumatically operated valve, the water may clog the valve.

Compressed gases have other uses, such as in the preservation of perishable materials. In such cases, it is important to avoid condensation which may lead to mildew or mold, in addition to causing corrosion of the equipment.

One prior art solution to the above-described problem is to use a cryogenic system, which refrigerates the air so as to liquefy as much water as possible. The water is preferably cooled to a temperature that is higher than the dewpoint of the air. The air is therefore in a superheated condition, wherein it has a dewpoint slightly above freezing, so that as long as the air temperature remains above the dewpoint, no liquid water will form. A cryogenic system has the obvious disadvantage that it requires the transportation and storage of cryogenic liquids, which inherently consumes energy. Also, the cryogenic liquids must be periodically replenished.

Another solution proposed in the prior art has been the use of a molecular sieve, i.e. a packed bed that absorbs water. But a packed bed has the disadvantages that it is not feasible for use in a continuous process, and that it must be periodically regenerated or replaced when its pores have become filled.

Polymeric membranes have long been used in the non-cryogenic separation of components of air. Such membranes have also been used in separating water from air. A membrane has the inherent advantage that it does not require energy to operate. A membrane system has no moving parts, and thus requires little or no maintenance. However, the membrane dryers of the prior art have been less efficient than other drying methods of the prior art. In general, prior art membranes have shown an efficiency of about 75%, compared with efficiencies of up to about 98% with some prior art techniques.

The present invention provides a membrane, and a method of making the membrane, having substantially improved efficiency in removing water from compressed air.

SUMMARY OF THE INVENTION

In one embodiment, the present invention comprises an air dehydration membrane which is made of a hydrophilic polymer having a permeability for water vapor which is greater than its permeability for air, and wherein the hydrophilic polymer has low selectivity between oxygen and nitrogen. The polymer is coated with another hydrophilic material, which may also be a polymer, the coating being chosen such that the coating does not affect the selectivity of the coated membrane with respect to oxygen and nitrogen, but does increase selectivity of the membrane with respect to water vapor. The membrane is preferably formed as a hollow fiber, and the coating is applied to the bore side of the fiber.

Preferred materials for the hydrophilic polymer used to make the membrane include polysulfone and poly ether sulfone, polysulfone being especially preferred. Preferred materials for the coatings include poly vinyl alcohol and Triton X-100. The air permeability of the uncoated polysulfone membrane is in the range of about $2.5\text{-}20\times 10^{-4}$ cm$^3$/cm$^2$·sec·cmHg.

The preferred membrane used in the present invention is such that the dominant mechanism for the flow of gases through the membrane is Knudsen flow. The presence of Knudsen flow implies a pore size which is sufficiently small to allow the inside (bore side) of the fiber to be easily coated, but which still allows sufficient permeation so that the membrane can separate air from water vapor.

The invention also comprises a method of making an air dehydration membrane. In one embodiment, the method includes forming a polysulfone polymer into a hollow fiber, coating the bore side of the fiber with a solution of poly vinyl alcohol or Triton X-100, and drying the coated fiber. The formation of the fiber is preferably accomplished by mixing polysulfone with a solvent and a non-solvent to form a spin dope, which is then extruded to form the hollow fiber. The solvent and non-solvent are then removed, and the fiber is coated with the polyvinyl alcohol or Triton X-100. The coated fiber is then dried and preferably heat treated.

The present invention therefore has the primary object of providing an air dehydration membrane.

The invention has the further object of providing an air dehydration membrane which is lower in cost than, and at least as efficient as, dehydration membranes of the prior art.

The invention has the further object of reducing the cost of removing water or water vapor from compressed air streams.

The invention has the further object of providing a membrane-based technology that permits efficient dehydration of air streams.

The invention has the further object of providing a membrane for air dehydration, wherein the membrane is economically advantageous relative to other methods of the prior art.

The invention has the further object of providing a method of making an air dehydration membrane.

The reader skilled in the art will recognize other objects and advantages of the present invention, from a reading of the following detailed description of the invention, and the appended claims.

DETAILED DESCRIPTION OF THE INVENTION

The present invention includes a membrane, or a series of membranes, and a process for making such membranes, for use in effectively dehumidifying compressed air.

In its most basic form, the present invention comprises a porous membrane, preferably having the form of a hollow fiber, the membrane being made of a hydrophilic polymer which has a hydrophilic coating. The polymer is chosen such that its permeability for water vapor is much greater than its permeability for air. Preferably, the polymer is such that it still allows air to flow through it, and does not show appreciable selectivity for oxygen relative to nitrogen. The coating is chosen such that the coating does not affect the selectivity of the overall fiber for oxygen and nitrogen, but does increase the selectivity of the fiber for water vapor. The coating may itself be a polymeric material, and preferably has a high molecular weight and a high boiling point.

In one preferred embodiment, the membrane is a surfactant-coated polysulfone hollow fiber membrane, or a poly vinyl alcohol-coated polysulfone membrane, or a poly vinyl alcohol-coated poly ether sulfone membrane. All of the coatings are applied on the bore side of the membrane.

The most preferred material for the membrane is polysulfone. The polysulfone membrane, before it is coated, has an air permeability in the range of about $2.5\text{-}20\times10^{-4}$ $cm^3/cm^2 \cdot sec \cdot cmHg$.

The membrane of the present invention is chosen such that the dominant mechanism for gas flow through the membrane is Knudsen flow. Knudsen flow occurs when the collisions of gas molecules with the wall of the membrane are more frequent than the collisions of the molecules with themselves. It has been shown that, for Knudsen flow, the ratio of the permeabilities for two gaseous components is inversely proportional to the square root of the ratio of molecular weights of those components.

Thus, for example, oxygen ($O_2$) has a molecular weight of 32 and nitrogen ($N_2$) has a molecular weight of 28. For Knudsen flow through a membrane, the ratio of the permeability of oxygen to the permeability of nitrogen is proportional to $(28/32)^{1/2}$, or about 0.94. Thus, when the ratio of permeabilities of nitrogen and oxygen, through a membrane, has the aforementioned value, one can infer that the gas flow through the membrane is primarily Knudsen flow.

The presence of Knudsen flow implies that the membrane has a pore size which is sufficiently small to allow the inside (the "bore side") of the fiber to be easily coated, but which still allows sufficient permeation so that the membrane can separate air from water vapor. If the pores are too large, it may be difficult to coat the fiber economically, because too much of the coating material may simply leak through the membrane instead of remaining on the inside of the membrane as a coating.

The membranes of the present invention achieve the selective removal of water vapor while not significantly altering the relative concentrations of oxygen and nitrogen found in the feed stream.

The membranes of the present invention can be provided as part of a module into which water vapor (saturated or near saturated) and compressed air are introduced. The module produces a dry pressurized product stream (typically having an oxygen concentration within about 1% of 20.9%) and a low pressure permeate stream. The permeate stream contains a mixture of air and the bulk of the water vapor introduced into the module.

Permeated air or a secondary dry sweep stream may be used to optimize the dehydration process. If the membrane were totally efficient in water separation, all the water or water vapor in the feed stream would be removed, and there would be nothing to sweep it out of the system. As the process proceeds, the partial pressure of the water on the bore side becomes lower and lower, and the pressure on the shell-side becomes higher. This pressure difference tends to prevent additional water from being expelled from the module. Since the object is to make the bore side dry, the pressure difference interferes with the desired operation of the device. A sweep stream is therefore used to remove the water or water vapor from the bore side, in part by absorbing some of the water, and in part by physically pushing the water out.

If a sweep stream is used, it may come from an external dry source or a partial recycle of the product stream of the module. In general, the degree of dehumidification will depend on the partial pressure ratio of water vapor across the membrane and on the product recovery (the ratio of product flow to feed flow). Better membranes have a high product recovery at low levels of product humidity and/or higher volumetric product flow rates.

The membranes of the present invention are easily made at low cost, and can outperform existing commercial membranes in either volumetric productivity or product recovery.

The membrane of the present invention can be spun into a fiber using the techniques described in U.S. Pat. No. 4,772,392, the disclosure of which is incorporated by reference.

The following examples illustrate the manufacture of the membranes of the present invention.

EXAMPLE 1

Polysulfone polymer (product number UDEL P-1835, obtained from Solvay Plastics) is combined with tri-ethylene glycol (TEG) and n-methyl-pyrrolidinone (NMP) to form a spin dope that is extruded through a multi-filament hollow fiber die. The range of ratios of solvent (NMP) to non-solvent (TEG) can be from about 2.0 to about 4.0, with 2.5 being the preferred ratio. The polymer concentration range can be from about 40 to about 65% by weight, with 50% by weight being the preferred concentration. Die temperatures can range from about 75° C. to about 110° C., with 90° C. being the preferred spin temperature. Blowing a core gas through the center of an annular ring die forms the hollow fiber profile. The flow rate of the core gas can range from about 15 to about 30 SCCM, with 24 SCCM being preferred in order to achieve the desired fiber size of about 280 to about 350 microns for the outer diameter, and about 200 to about 250 microns for the inner diameter.

After the fiber is formed as described above, the fiber exits the spin die and is passed through 1) a controlled atmosphere quench zone, 2) a cold quench, and 3) a hot leach, after which the fiber is taken up onto a core.

The quench zone (or "draw zone") uses a quench cabinet to control quench air flow rate, temperature, and humidity. Air flow rates of about 2 to about 7 SCFM are used, with 4 SCFM being preferred. The temperature range is about 5° C. to about 25° C., with 12-15° C. being preferred. The humidity range is about 35% to about 90% relative humidity, with 80% relative humidity being preferred.

After passing through the quench or draw zone, the fibers enter a low temperature water bath, which comprises the cold quench. This bath sets the fiber and starts the process whereby the entrained solvent and non-solvent are leached out. The temperature range for this low temperature bath is about 3° C. to about 15° C., with 4.5° C. being preferred. The residence time in the quench bath is less than about 0.5 seconds.

The fiber next goes through a hot water leach bath where a majority of the remaining solvent/non-solvent is removed. The temperature range for the hot water leach bath is about 75° C. to about 90° C. with 80° C. being preferred. The residence time in this bath is less than about 2 seconds. The leach bath includes two sets of driven rollers, wherein each set of rollers can be made to rotate at a different speed. Operating the second, or exit, set of leach bath rollers at a higher speed than the first set allows the fibers to be tensioned or stretched to varying degrees. The speed differential of the rollers used in making the present fiber can range from about 0% to about 20%, with 10% being preferred. The organic levels in both baths (quench and leach) can range from about 0% by weight to about 1% by weight, with a percentage of less than about 0.5% by weight being preferred.

After passing through the leach bath, the fibers are then taken up onto a typical textile fiber core to await further processing. The fibers may then be woven into a fabric, using a loom, and arranged in modules, as is fully described in U.S. Pat. No. 5,598,874, the disclosure of which is incorporated by reference.

Following the weaving process, the fiber is potted into a test module that allows for the pressure isolation of the bore side of the fiber from the shell-side of the fiber. This potting process is done through the use of an epoxy resin to form two tubesheets at either end of the fiber bundle.

The fibers of the test module are then coated with a solution, in water, of 4% PVA (Poly vinyl alcohol, 98-99% hydrolyzed, 31,000-50,000 Mw, supplied by the Aldrich Chemical Company). The coating solution is prepared by first weighing out the PVA and water and then heating the mixture to about 80-90° C. for about 2-3 hours, to allow the PVA to dissolve. Once dissolved, the solution is filtered and cooled to near room temperature. The solution is then passed through the module on the bore side at 0 to 25 psig. The module is then air dried by passing air through the bore of the fibers.

Once dried, the module can be tested for air dehydration properties. To give enhanced durability, the module is heat treated to about 80-85° C. for 5 hours, to crystallize the PVA coating and make it insoluble in water. The coating, drying and heat treatment process may be repeated to give improved performance.

The fiber made according to this Example has an oxygen/nitrogen selectivity of 0.92, which indicates the presence of Knudsen flow. The fiber has pores which have dimensions of the order of 10-100 angstroms, which inference is based on the observation that one sees Knudsen flow for oxygen and nitrogen. The fiber is also hydrophilic, with a high permeability for water vapor relative to its permeability to air.

EXAMPLE 2

The process of Example 1 was repeated with an ultrafiltration fiber obtained from the Hydranautics Corporation. This fiber is commercially available, and is sold under the trademark HYDRACAP. The fiber has been used for water purification processes, and is categorized as a UF (ultrafiltration) membrane of Hydranautics Corp. The fiber is made of poly ether sulfone, instead of polysulfone. The fiber is quite large, having an outside diameter of 0.049 inches.

The fiber used in this Example is porous and hydrophilic, and has essentially no selectivity between oxygen and nitrogen. It has a high water vapor permeability relative to its permeability to air. Its pores have a size of the order of 100 to 1000 angstroms.

The fibers used in this Example are initially impermeable to air with no discernible air dehydration properties. The fiber must first be flushed with pressurized water to remove the water soluble pore filling material that is used in the storage of the fiber. Then the membrane can be air dried and tested for gas permeation properties. The water rinse step and air drying step were therefore conducted prior to the step of coating the fiber with PVA. The steps in this Example were otherwise the same as described in Example 1.

For both Example 1 and Example 2, the fiber was made of a membrane formed from a hydrophilic polymer having relatively little or no selectivity between oxygen and nitrogen. Both polymers have a high permeability for water vapor compared to their permeability for air.

The following Example describes the results of tests performed on modules made with the fibers produced in Examples 1 and 2, to evaluate their air dehydration properties.

EXAMPLE 3

Test devices were constructed to test the coated fibers described in Examples 1 and 2. The fibers were contained in copper tubing that was 38 inches long and 0.375 inches in diameter. The copper tubing had brass fittings at either end, with two fittings parallel to the module for connecting with the bore side of the fibers, and two fittings perpendicular to the fiber inset from tubesheets that connect to the shell-side of the fibers. Tubesheets at either end of the device were made with epoxy resins that, when cured, separated the bore side of the membranes from the shell-side. The latter arrangement allows for the isolated pressurization of either side of the membrane. The fibers made according to Example 1 had an outside diameter of 220 microns, and the test device used 180 fibers. These fibers are highly porous. The fibers used in Example 2 were much larger (having an outside diameter of 0.049 inches), and the test device contained only 6 such fibers. All test results are based on bore side pressurization and counter-current flow between the feed air and the resultant permeate flow.

The following Table I summarizes the performance of the fiber used in Example 2. The table shows the results obtained when the fiber has been flushed with water and dried, as described above. In Test No. 1, there was no coating of PVA. A single coating of PVA was used in Test Nos. 2-5, and a double coating of PVA was used in Test Nos. 6-9.

TABLE I

Fiber of Example 2, Evaluated at 100 psig with 75° F. Pressure Dewpoint Air

| Test Number | Coating/Treatment | Permeate Flow | Permeate Atmospheric Dewpoint (° F.) | Product Flow | Product Atmospheric Dewpoint (° F.) |
|---|---|---|---|---|---|
| 1 | None | 1.2 cfm | 30 | 1.2 cfm | 30 |
| 2 | 4% PVA | 1.13 lpm | 53 | 7 lpm | −3 |
| 3 | 4% PVA | 1.18 lpm | 43.3 | 3.4 lpm | −9.5 |
| 4 | 4% PVA | 1.2 lpm | 36 | 2.25 lpm | −21 |
| 5 | 4% PVA + 80° C. for 5 hours | 1.5 lpm | 50 | 5.7 lpm | −3 |
| 6 | Second 4% PVA Coating | .32 lpm | 61 | 2.06 lpm | 0 |
| 7 | Second 4% PVA Coating | .33 lpm | 53 | 1.36 lpm | −23 |
| 8 | Second 4% PVA Coating | .33 lpm | 44 | .73 lpm | −54 |
| 9 | Second 4% PVA Coating | .33 lpm | Not tested | .52 lpm | <−64 |

Test No. 1 was conducted with a test device provided by Hydranautics Corporation, the device being about 9 inches long and containing about 25 fibers. Test No. 1 was conducted at only 20 psig. The remaining tests shown in the table were conducted using the test device described in Example 3.

Table I shows that, without the PVA coating, the fiber did not exhibit any air dehydration properties. But the fiber that was coated exhibited a high degree of dehydration. The degree of dehydration was high with one coat and even higher with two coats. In all cases the oxygen level in the product gas was 20.9%, indicating no selectivity between oxygen and nitrogen for this fiber. Note that Test No. 5 included coating with PVA plus heat treatment at 80° C. for five hours.

The following Table II summarizes the performance of the fiber used in Example 1. Unlike the fiber used in Example 2, the fiber used in Example 1 was air permeable after the fiber fabrication process. In addition to PVA coatings, the fiber was tested with a coating of Triton X-100 to improve the air dehydration properties of the fiber. Triton X-100 is a non-ionic surfactant sold by Aldrich Chemical Company, under the product number 23,472-9. In the examples described herein, it was prepared in the form of a solution in water having a concentration of 150 ppm, and was coated in this form onto the fiber.

TABLE II

Fiber of Example 1, Evaluated at 100 psig with 75° F. Pressure Dewpoint Air

| Test Number | Coating/ Treatment | Permeate Flow (lpm) | Permeate Atmospheric Dewpoint (° F.) | Product Flow (lpm) | Product Atmospheric Dewpoint (° F.) |
|---|---|---|---|---|---|
| 1 | Triton X-100 (150 ppm) | 14 | 13 | 3 | <−64 |
| 2 | 4% PVA | 5.5 | 33 | 6.4 | <−64 |
| 3 | 4% PVA | 5.1 | 41.6 | 7.5 | −35 |
| 4 | 4% PVA + 80° C. for 5 hours | 5.2 | Not Tested | 7.6 | −37 |
| 5 | Second 4% PVA Coating | 6.2 | Not Tested | 10.6 | <−64 |
| 6 | Second 4% PVA Coating | 5.7 | 40 | 12.8 | −36 |
| 7 | Second 4% PVA Coating | 5.4 | 22 | 11.3 | −54 |
| 8 | Second 4% PVA Coating + second 80° C. for 5 hours | 5.2 | 45 | 12.5 | −30 |

Table II shows that both the Triton X-100 and the PVA coatings were effective in achieving excellent air dehydration properties. Oxygen levels in the dried product gas were measured to be in the range of about 21.6% to 21.9%, indicating that the air permeation was primarily due to Knudsen flow, where the oxygen/nitrogen selectivity is about 0.92.

The following Table III compares the results obtained with membranes of the present invention, with those obtained from commercially available dehydration membranes of the prior art.

The efficiency and productivity of the membranes made according to the present invention were compared with those of existing membrane dehydrators obtained from Hankison International. In particular, the membranes of the present invention were compared with published data for the Hankison HMD20-2 module, operated at 100 psig with 80° F. pressure dewpoint inlet air. The efficiency was defined as the ratio of the dry product gas flow to that of the inlet feed flow at various product dewpoints. The relative productivity is defined by the product flow rate for a given volume of device.

Since the test devices described above were smaller than the commercial devices, the test results were scaled to correspond to the size of the HMD20-2 device, which is 26.4 inches long and 2.1 inches in diameter. The scaling was done by taking a ratio of the fiber surface area in the test devices described above, to the surface area available to the fiber in the Hankison casing.

In comparing these devices, it was assumed that there was a 50% packing factor for the fiber, and that the inside casing diameter of the HMD20-2 device is about 1.7 inches, and that the active length of the fiber (i.e. the length of the module less the length of the tubesheets) was about 22 inches.

For the fiber made according to Example 2, with an outside diameter of 0.049 inches, one can fit 625 fibers into a module having a size comparable to that of the Hankison HMD20-2 module. Taking this fact into account, and also taking into account the change in length from 38 inches to 22 inches, one obtains a scaling factor for the flow of 60.

For the fiber made according to Example 1, the calculated fiber count is 19500, which yields a scaling factor of 62 for estimated product flow for a module having a size similar to the HMD20-2 device.

TABLE III

Comparison of Results of the Present Invention with Results Obtained from Commercially Available Hankison Membrane Dryers
100 psig, 80° F. Pressure Dewpoint

| Atm DP (° F.) | Hankison HMD20-2 Product Flow | Hankison HMD20-2 Product Recovery | Coated Fiber from Ex. 2 (Scaled Product Flow) | Coated Fiber from Ex. 2 (Product Recovery) | Coated Fiber from Ex. 1 (Scaled Product Flow) | Coated Fiber from Ex. 1 (Product Recovery) |
|---|---|---|---|---|---|---|
| 0 | 3.8 | 83% | 4.4 | 86.5% | | |
| −18 | 2.7 | 77% | 2.9 | 80.5% | | |
| −35 | 2 | 71% | | | 28 | 69% |
| −54 | 1.6 | 67% | 1.5 | 69% | 24.7 | 67.5% |
| <−64 | 1.4 | 66% | 1.1 | 61% | 23 | 63% |

The flows shown in Table III are in scfm. The first column shows the desired dewpoint. The flows used for the Hankison device are based on data provided by Hankison sales literature. The tests of the fiber made according to the present invention were scaled for meaningful comparison with a module having a size corresponding to the Hankison HMD20-2 product. The product recovery is the percentage of the feed flow that becomes dry product air.

Examination of Table III shows that the membranes of the present invention, in all cases but one, yield results that are superior to those of the prior art. In particular, the membrane made according to Example 1 showed nearly the same product recovery percentages as the prior art, but had substantially greater product flow. The membrane made according to Example 2 showed product recovery percentages and product flows that were, in all cases but one, greater than that obtained from the prior art material. The only exception was the case where the desired dewpoint was <−64° F.

The following is a discussion of the physical mechanisms believed to underlie the present invention. However, the invention should not be deemed limited by the following explanation.

It is believed that air and water vapor pass through the membrane of the present invention by three different means.

For water vapor penetration, the relevant mechanisms are:
1) permeation through the dense polymer;
2) viscous flow through the pores; and
3) Knudsen flow through the very fine pores.

The permeation through the dense polymer is believed to be the dominant factor for water vapor penetration.

For air penetration, the relevant mechanisms are:
1) permeation through the dense polymer;
2) viscous flow through the pores; and
3) Knudsen flow through the very fine pores.

The permeation through the dense polymer is believed to be a minor factor. The viscous flow through the pores is believed to be the dominant factor for the fiber of Example 2, and the Knudsen flow through the very fine pores is believed to be dominant for the fiber of Example 1.

It appears that the permeation through the membrane (either for water vapor or for air) is not greatly impacted by the coatings applied to the membrane. The viscous pore flow and the Knudsen flow are lowered by the coatings, however. The coatings therefore serve to improve the dehydration properties of the membrane because the water vapor permeation is dominated by permeation through the dense polymer, which is unchanged by the coating, while the permeation of air is lowered because its rate is dependent on the viscous flow and Knudsen flow which are both lowered by the coating, and since the permeation through the polymer is insignificant for air.

The reader skilled in the art will recognize that the invention can be modified in various ways. The membrane can be provided in various shapes and sizes. Materials other than those specifically described may be used, as long as they satisfy the physical criteria set forth above. These and other similar modifications should be deemed within the spirit and scope of the following claims.

What is claimed is:

1. An air dehydration membrane comprising a hydrophilic polymer having a permeability for water vapor which is greater than its permeability for air, said hydrophilic polymer also showing low selectivity between oxygen and nitrogen, the polymer having a hydrophilic coating, wherein the coating is chosen such that the coating does not affect the selectivity of the coated membrane with respect to oxygen and nitrogen, but does increase selectivity of the membrane with respect to water vapor, wherein the membrane in an uncoated condition has a permeability for air in a range of about $2.5\text{-}20\times10^{-4}$ $cm^3/cm^2\cdot sec\cdot cmHg$, and wherein the membrane is selected such that a dominant mechanism for gas flow through the membrane is Knudsen flow.

2. The membrane of claim 1, wherein the hydrophilic polymer is polysulfone.

3. The membrane of claim 2, wherein the polymer is present in a concentration of about 40% to about 65% by weight.

4. The membrane of claim 1, wherein the coating is selected from the group consisting of poly vinyl alcohol and a non-ionic surfactant.

5. The membrane of claim 2, wherein the coating is selected from the group consisting of poly vinyl alcohol and a non-ionic surfactant.

6. The membrane of claim 5, wherein the membrane has the form of a hollow fiber.

7. The membrane of claim 6, wherein the fiber has a bore side and a shell side, and wherein the coating is formed on the bore side.

8. A method of making an air dehydration membrane, comprising:
a) forming a polysulfone polymer into a hollow fiber, the fiber having a bore side and a shell side, the polymer having a permeability for air in a range of about $2.5\text{-}20\times10^{-4}$ $cm^3/cm^2\cdot sec\cdot cmHg$, and wherein the polymer is constructed such that gas flow through the polymer is primarily Knudsen flow,
b) coating the bore side of the fiber with a solution selected from the group consisting of poly vinyl alcohol and a non-ionic surfactant, and
c) drying the coated fiber.

9. The method of claim 8, wherein step (a) includes blowing a gas through an annular die so as to form the hollow fiber.

10. The method of claim 8, wherein step (a) includes combining the polymer with a solvent and a non-solvent to form a spin dope, and extruding the spin dope to form the hollow fiber.

11. The method of claim 10, wherein the solvent is selected to be n-methyl-pyrrolidinone, and wherein the non-solvent is selected to be tri-ethylene glycol.

12. The method of claim 10, wherein the solvent and non-solvent are selected to be present in a ratio of about 2.0 to about 4.0 of solvent to non-solvent.

13. The method of claim 10, wherein the polymer is present in a concentration of about 40% to about 65% by weight.

14. The method of claim 10, wherein step (a) includes the step of removing solvent and non-solvent from the fiber.

15. The method of claim 8, wherein step (b) includes selecting a concentration of the solution of poly vinyl alcohol to be about 4%.

16. The method of claim 8, wherein step (c) includes air drying and heat treating the coated fiber.

17. The membrane of claim 1, wherein the coating consists essentially of an aqueous solution of poly vinyl alcohol.

18. The membrane of claim 1, wherein the coating consists essentially of an aqueous solution of a surfactant.

19. The method of claim 8, wherein the coating step comprises coating the bore side of the fiber with a solution which consists essentially of an aqueous solution of poly vinyl alcohol.

20. The method of claim 8, wherein the coating step comprises coating the bore side of the fiber with a solution which consists essentially of an aqueous solution of a surfactant.

* * * * *